(12) United States Patent
Hahn et al.

(10) Patent No.: US 7,481,161 B2
(45) Date of Patent: Jan. 27, 2009

(54) PLUNGER-CYLINDER ASSEMBLY

(75) Inventors: Matthias Hahn, Saarburg (DE); Volker Manternach, Wasserliesch (DE)

(73) Assignee: LAEIS GmbH, Wecker (LU)

( * ) Notice: Subject to any disclaimer, the term of this patent is extended or adjusted under 35 U.S.C. 154(b) by 0 days.

(21) Appl. No.: 11/995,482

(22) PCT Filed: Jul. 11, 2006

(86) PCT No.: PCT/EP2006/006791
§ 371 (c)(1),
(2), (4) Date: Mar. 4, 2008

(87) PCT Pub. No.: WO2007/006557
PCT Pub. Date: Jan. 18, 2007

(65) Prior Publication Data
US 2008/0210108 A1    Sep. 4, 2008

(30) Foreign Application Priority Data
Jul. 11, 2005    (DE) .................... 10-2005-032-297

(51) Int. Cl.
*B30B 1/32* (2006.01)
*F16F 11/00* (2006.01)

(52) U.S. Cl. ................ 100/269.18; 100/269.01; 100/269.05; 100/269.11; 100/269.14; 91/394; 92/9; 92/12.2; 92/24; 92/27; 92/85 A; 92/85 B; 92/169.1; 425/451.2

(58) Field of Classification Search ........... 100/269.01, 100/271, 269.05, 269.11, 269.14, 269.18, 100/269.19; 92/9, 23, 24, 27, 28, 85 A, 85 B, 92/134, 169.1, 172; 91/392, 394, 452, 454; 425/DIG. 14
See application file for complete search history.

(56) References Cited

U.S. PATENT DOCUMENTS

| | | | |
|---|---|---|---|
| 2,815,004 A | 12/1957 | Droman | |
| 3,536,128 A | 10/1970 | Bachelier | |
| 3,631,760 A * | 1/1972 | Moran | ........................ 91/402 |
| 3,893,377 A | 7/1975 | Mannetje | |
| 4,052,850 A | 10/1977 | Mohaupt | |
| 4,210,064 A | 7/1980 | Beerens | |
| 4,633,758 A | 1/1987 | Kedzierski | |
| 4,841,846 A * | 6/1989 | Grambling | ..................... 92/60 |

FOREIGN PATENT DOCUMENTS

| | | |
|---|---|---|
| DE | 3530800 A1 | 3/1987 |
| DE | 29812712 U1 | 1/1999 |
| DE | 19805519 C1 | 7/1999 |
| DE | 10218145 A1 | 10/2002 |
| DE | 20213021 U1 | 12/2002 |

(Continued)

*Primary Examiner*—Jimmy T Nguyen
(74) *Attorney, Agent, or Firm*—Schwabe Williamson & Wyatt

(57) ABSTRACT

A plunger-cylinder assembly for a press including a plunger which is accommodated at least in part in a cylinder while separating the interior of the cylinder into two partial chambers along the cylinder axis. A relieving device which counteracts an increase in pressure of a fluid accommodated in the first partial chamber is disposed in at least one first partial chamber the increase in pressure being caused by a movement of the plunger along the cylinder axis in the direction of the first partial chamber. A hydraulic press encompassing such a plunger-cylinder assembly is also described.

25 Claims, 4 Drawing Sheets

FOREIGN PATENT DOCUMENTS

| | | |
|---|---|---|
| DE | 20213022 U1 | 1/2003 |
| EP | 186002 A1 | 7/1986 |
| EP | 1416165 A2 | 5/2004 |
| FR | 1361239 | 5/1964 |
| GB | 1563847 | 4/1980 |
| GB | 2407624 A | 5/2005 |
| JP | 2003343516 | 12/2003 |

* cited by examiner

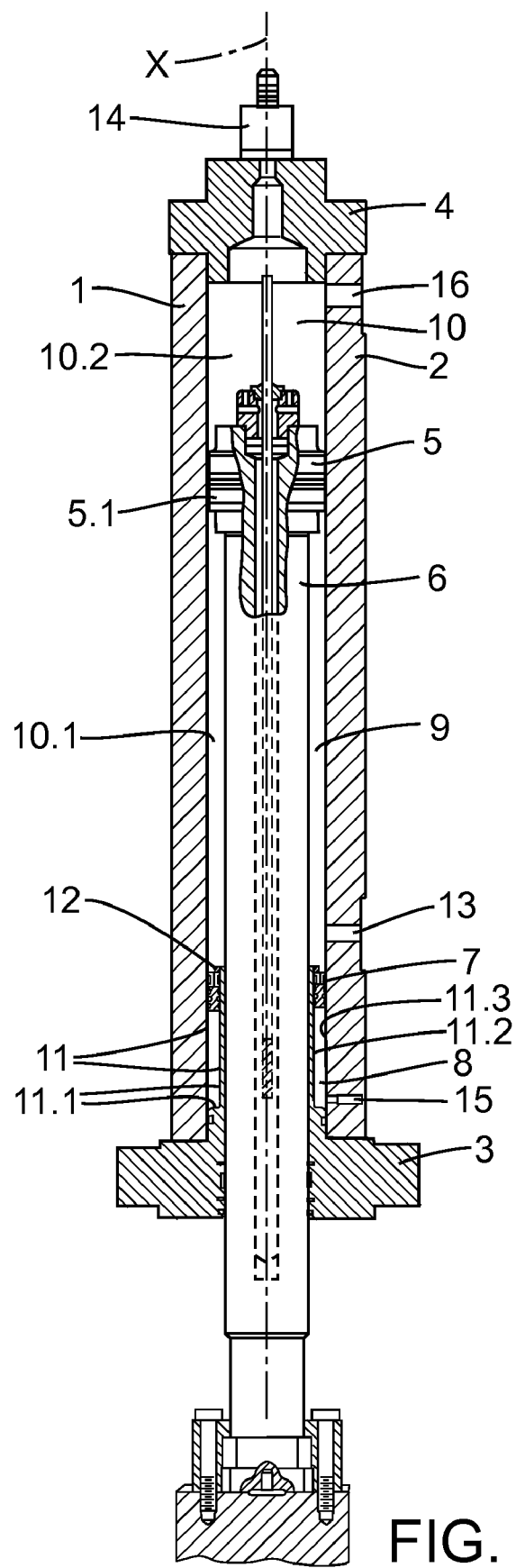
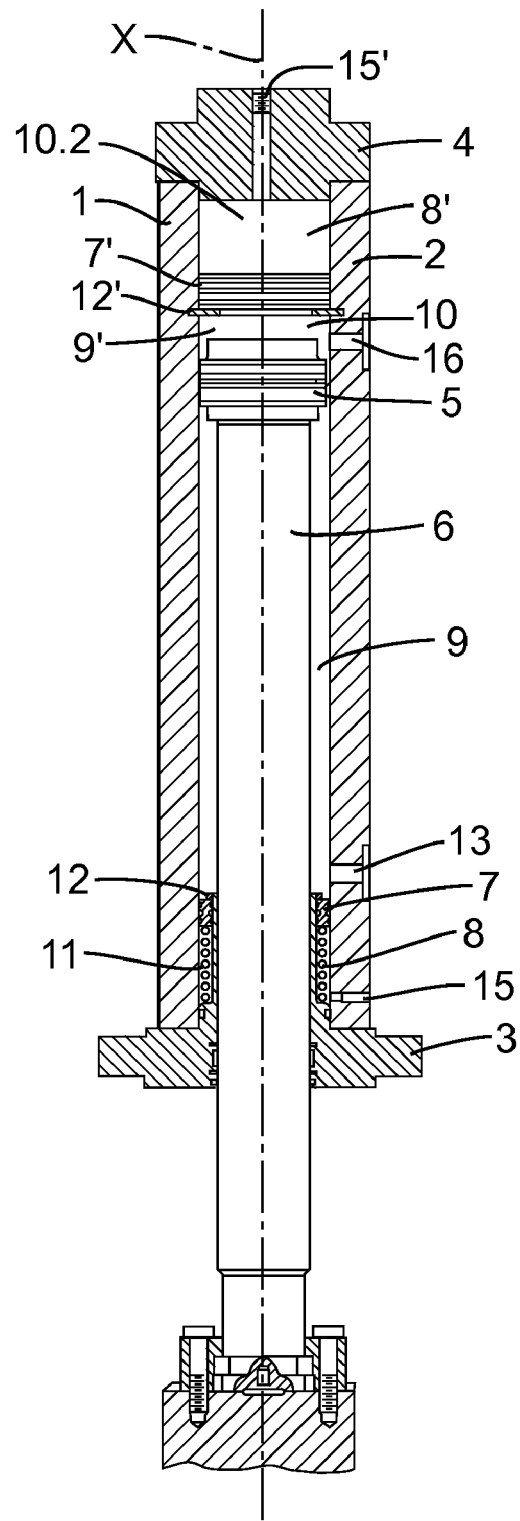
FIG. 3
FIG. 4

US 7,481,161 B2

PLUNGER-CYLINDER ASSEMBLY

CROSS REFERENCE TO RELATED APPLICATIONS

The present application is a national phase entry of, and claims priority under 35 U.S.C. § 120 to, International Patent Application No. PCT/EP2006/006791, originally filed Jul. 11, 2006 based on German Application No. 10 2005 032 297.2, originally filed Jul. 11, 2005, entitled "PLUNGER-CYLINDER ASSEMBLY" and which designates the United States of America, the entire content and disclosure of which is hereby incorporated by reference in its entirety.

TECHNICAL FIELD

The invention relates to a piston-cylinder assembly for a press, equipped with a piston that is partially accommodated in a cylinder and divides the interior of the cylinder into two subchambers along the cylinder axis and also relates to a hydraulic press equipped with such a piston-cylinder assembly.

BACKGROUND

Piston-cylinder assemblies of this kind are known and depending on their design, are referred to as differential cylinders or synchronizing cylinders. They are essentially used in hydraulic and pneumatic applications in order to transmit forces in all conceivable working directions. Particularly in the context of the present invention, such piston-cylinder assemblies can be used for presses. The term "press" is understood in this context to be a generic term for variously functioning hydraulic presses, by means of which, through the hydraulic exertion of force, an extremely wide variety of products can be shaped or manufactured. Examples of such presses include a hydraulic stamping press, guillotine shears, a press for the fireproofing and tile industry, a press for manufacturing salt products, etc.

The shaping process for products can be performed in such a way that two main axes, at least one of which is a movable axis, are moved in relation to each other and thus execute the shaping procedure. In a press used in the fireproofing industry, loose bulk material, for example, is pressed into a mold by the relative movement of the main axes, which at least partially establishes the shape of the pressed item manufactured by means of the pressing procedure. By contrast with a stamping press process or guillotine shears process, the end of which is established by the completion of the stamping step or shearing procedure, with the above-described press used in the fireproofing industry, the shaping procedure is discontinued when the axes have traveled a certain distance, when a certain pressure has been reached in the main cylinders, or when both of these criteria lie within a defined tolerance range.

Piston-cylinder assemblies of the type mentioned at the beginning are not used exclusively for the main cylinders or main working axes; there can also be auxiliary functions for which the piston-cylinder assemblies are likewise used. One such auxiliary function, for example, is the movement of the mold wall of the mold after completion of the pressing procedure in an above-introduced press from the domain of the fireproofing industry. This is the so-called demolding of the pressed item from the mold; the pressed item rests against a stationary die or main cylinder while the mold wall is moved relative to the main working axis by means of a movement produced by a piston-cylinder assembly, thus removing the mold from the pressed item.

Depending on the arrangement of the auxiliary cylinder in relation to the press, the demolding procedure can occur as a result of an effective direction oriented in the direction of the extending or retracting piston rod of the auxiliary cylinder. Naturally, if the mold wall is kept stationary, it is also possible to demold the pressed item through a movement of a main cylinder.

However, it has turned out that piston-cylinder assemblies of the type mentioned at the beginning are only satisfactory to a limited degree with regard to their durability in the normally customary technical design since after a relatively short period of operation, damage occurs in the cylinders themselves, e.g., the welded seams, and in other components coupled to the piston-cylinder assemblies, such as position measuring systems or line systems; various other mechanical damages occur as well. The observed, less-than-satisfactory service life of the piston-cylinder assembly and other components means that the corresponding parts have to be embodied in a reinforced way since otherwise, the parts have to be repaired or replaced, which is expensive, and where necessary, the press may not be operational during repair work, thus resulting in production downtimes.

Attempts have been made to remedy this problem by building dampers such as hydropneumatic shock absorbers into the line systems to which the piston-cylinder assemblies are connected. Such measures, however, have not had the desired effect.

U.S. Pat. No. 2,815,004 has disclosed pneumatic pruning shears in which the recoil of a piston situated in a cylinder is cushioned by the combined action of an air cushion provided in the cylinder and a spring device attached to the piston.

GB 1 563 847 has disclosed an apparatus for producing an instantaneous pressure on a workpiece. The apparatus disclosed therein includes a piston-cylinder assembly in which a subchamber of the cylinder interior oriented away from the workpiece is filled with a gas, which, through an instantaneous volume expansion, is able to exert an instantaneous pressure on the workpiece by means of the piston of the device. This instantaneous expansion is possible in that a preceding pressure-relief valve produces an instantaneous pressure decrease in the subchamber of the cylinder on the opposite side from the gas-filled subchamber.

EP 0 186 002 A1 has disclosed a device for suppressing pressure peaks in the press assembly of a die-casting machine. In the die-casting machine, a press cylinder with a press piston is provided; inside the press piston, an auxiliary piston is provided, which is movable in the axial direction of the press piston. During an extending movement of the press piston in a mold-filling phase, a braking of the press piston at the beginning of the secondary pressing phase generates a pressure increase in the hydraulic fluid contained in the press cylinder on the piston surface side. The pressure peaks thus occurring at the transition to the secondary pressure phase are prevented by a movement of the auxiliary piston inserted into the press piston. To that end, a connecting line is routed through the press piston to a cylindrical guide situated behind the auxiliary piston.

U.S. Pat. No. 3,536,128 has disclosed an injection assembly for a die-casting machine in which an injection piston is coupled to a hydraulic die via a fluid-filled damping chamber. The damping chamber is situated in a cylinder between the injection piston and the hydraulic die. In a first phase, these two pistons both move at the same speed toward the mold. Upon coming into contact with the filled mold, the injection piston meets a resistance that brakes its movement toward the mold. This results in a pressure increase in the damping chamber that is counteracted by the fact that the fluid contained in the damping chamber is permitted to exit the damping chamber, whose volume decreases in the process. The fluid can escape by means of devices that are situated either inside the hydraulic die or inside the injection piston.

SUMMARY OF THE INVENTION

In view of the above described problem that exists in the prior art, the object of the present invention is to produce a piston-cylinder assembly of the type mentioned at the beginning, which, when used in a press, on the one hand, has an increased service life itself and on the other hand, increases the service life of other components connected to the piston-cylinder assembly, thus making it possible to extend service life of these parts of the press.

This object is attained in a surprisingly simple fashion in that situated in at least one first subchamber, there is a pressure-relief device that counteracts a pressure increase of a fluid contained in the subchamber resulting from a movement of the piston along the cylinder axis toward the first subchamber.

The idea for this invention is based on a precise, thorough analysis of the dynamic pressure conditions in the entire hydraulic system in which the piston-cylinder assembly is contained. This analysis yielded the realization that the less-than-satisfactory service life of conventional piston-cylinder assemblies is due to mechanical stresses, which, in turn were due to mechanical vibration excitations in the entire hydraulic system. These mechanical vibration excitations can occur when a fluid contained in one of the subchambers is subjected to a pressure increase through a movement of the piston along the cylinder axis toward the subchamber and an escape of the fluid into the connected line system due to this pressure increase represents a flow resistance. Then a pressure peak occurs in the connected hydraulic system, which counteracts the movement of the piston that causes this pressure increase. When there is a force generated in this way, which counteracts the force that generates it, this excites a vibration, with a correspondingly high mechanical stress for the entire machine.

In a piston-cylinder assembly according to the invention, however, the pressure-relief device situated in this subchamber counteracts the pressure increase, thus preventing it from generating any pressure peaks or at least only permitting it to generate smaller pressure peaks, thus also resulting in no vibration excitation or at least only a weaker vibration excitation. In other words, the pressure increase is trapped in the chamber in which it occurs, before it can generate dangerous pressure peaks.

To further illustrate the function of the piston-cylinder assembly according to the invention, the above-discussed example of a press used in the domain of the fireproofing industry will be employed again and the above-mentioned analysis will be explained in conjunction with this example. In this connection, the piston-cylinder assembly should be used for an auxiliary function of demolding a pressed item from a shaping mold by moving a mold wall.

It should first be noted that the forces that come into play in the use of such a press in the forming sector are on the order of 4,000 kN to 36,000 kN. If such forces are used to compress and shape loose bulk material in the mold, then a high pressure is also generated on the side walls of the mold, oriented transversely in relation to the main working axis, and the bulk material is pressed against the side walls of the mold, with powerful forces oriented transversely in relation to the main working axis. Between the pressed item (compressed bulk material) and the mold wall, there is a correspondingly powerful static friction, even after the end of the shaping procedure. This static friction must be overcome when the piston-cylinder assembly demolds the pressed item, i.e., a comparatively powerful force is required to move the mold wall.

The precise strength of the force required to overcome the static friction, however, cannot be precisely calculated because it depends on a very large number of parameters, for example, the material that is compressed, the number of cavities in the mold, the pressing force, the dimensions of the pressed item (the surface area in contact with the mold wall), etc.

The usual procedure for demolding the pressed item must also be carried out as a function of this unknown force for the demolding. In a (second) subchamber of the cylinder, for example, on the piston side, a pressure is built up relatively slowly, which when a critical value is reached, is sufficient to allow the piston-cylinder assembly to act on the mold wall with the force required to overcome the static friction. When the static friction is overcome, the transition from static friction to sliding friction occurs suddenly and the piston moves, thus initiating the process of demolding the pressed item.

The movement of the piston, however, causes a pressure increase in the other (first) subchamber or more precisely, in the fluid contained therein. The reason for this pressure increase is that during the pressure increase on the piston side or in the fluid contained on the piston side, a definite compression volume has formed in the pressurized volume of the cylinder chamber on the piston side. The pressure-relief of this compression volume, which occurs in a very short period of time, causes the piston to move toward the cylinder annular surface chamber, causing a pressure increase therein. As a result of the pressure increase, the axis, i.e., the fluid contained in this cylindrical annular chamber, is accelerated very powerfully in the direction toward the extending piston rod. This can result in calculated acceleration values of more than 10g. The volumetric flow of the fluid accompanying this acceleration is usually conveyed to a closed pressure-limiting valve with a preset pressure value. Depending on the preset pressure value, the axis is then braked by means of an uncontrolled pressure increase in the cylindrical annular surface chamber. This step, however, does not occur "fast"enough, as a result of which the uncontrolled pressure increase generates a pressure peak in the cylindrical annular surface chamber, directed toward the annular surface of the cylinder and therefore in opposition to the movement generating the initial pressure increase. A vibration excitation occurs, accompanied by the above-mentioned negative effects for the machine.

If, however, a piston-cylinder assembly according to the present invention is used, then the built-in pressure-relief device according to the invention counteracts the pressure increase that causes the pressure peaks and therefore the mechanical vibration excitation, right at the location in which it is generated. This achieves at least a weakening if not to a complete suppression of the pressure peak, counteracts the vibration excitation, and thereby extends the service life of the piston-cylinder assembly and, by reducing the mechanical strain on the entire hydraulic system, also extends the service life of connected components such as a position measuring system or line systems.

Because of the aspects explained above, it is also understandable why, with the usual technical design, prior attempts to improve the service life of the piston-cylinder assembly have met with failure. The pressure-relief valve is too slow for such a dynamic action. In addition, there is no sensor known from the most recent prior art that is capable of converting the fast movement sequences into corresponding switching movements. The dampers built into the line system are not fully effective since the natural frequency of the cylinder line system is reduced by the line resistance associated with conduit routing. In addition, the pulsation dampers that have been used previously are still too slow for the process addressed here.

Another advantage of the built-in pressure-relief device according to the invention lies in the fact that the pressure-relief device, without being controlled by sensors or other mechanisms, reacts directly to the pressure increase in the fluid contained in the first subchamber. This assures a very uncomplicated reaction mechanism that is also not highly susceptible to interference.

However, the integration of the pressure-relief device into the cylinder interior has reduced the stroke space of the piston-cylinder assembly. Therefore, in order to be able to implement the same stroke as a piston-cylinder assembly without the built-in pressure-relief device, the cylinder of the piston-cylinder assembly must correspondingly be a certain amount longer when using a pressure-relief device according to the invention.

In a preferred embodiment, in a region of the first subchamber, the pressure-relief device has a pressure-relief chamber that a partitioning arrangement divides from a subspace of the first subchamber, which subspace contains the accommodated fluid. When used, such a pressure-relief chamber advantageously provides an additional expansion volume for the fluid contained in the subspace.

The partitioning arrangement of the pressure-relief chamber is suitably designed so that at least a subregion of the partitioning arrangement permits a volume expansion of the subspace. This makes it possible in a particularly simple way for the fluid to expand to a greater volume, thus allowing the pressure to decrease and counteracting the pressure increase.

In this connection, the subregion is in particular embodied so that the expansion of the subspace is accompanied by a volume decrease of the pressure-relief chamber. This maintains a spatial division between the subspace and the pressure-relief chamber, allowing a particularly advantageous and time-saving preparation of the pressure-relief device for another pressure-relief cycle.

In a preferred embodiment, the subregion is embodied in the form of a pressure-relief piston that is supported so that it is movable in relation to a reference point, e.g., the cylinder. Since the partitioning arrangement of the pressure-relief chamber is subjected to high pressures, a pressure-relief piston represents a particularly stable part of the pressure-relief device. Despite its stable embodiment, the pressure-relief piston can have a low mass.

A bearing surface is advantageously provided for guiding the movement of the pressure-relief piston. This reliably assures a sliding of the pressure-relief piston in the pressure-relief device.

In this case, the bearing surface itself suitably constitutes part of the partitioning arrangement. The pressure-relief device can thus be implemented in a material-saving and above all space-saving way.

The pressure-relief device can advantageously have an element, which prevents an unlimited movement of the pressure-relief piston that enlarges the volume of the pressure-relief chamber and which is embodied in a structurally simple fashion as a stop element. Having such an element makes it possible to prevent an undesired movement of the pressure-relief piston into the subspace, which would otherwise occur with a corresponding negative pressure difference between the subspace and the pressure-relief chamber.

The pressure-relief chamber suitably has a connection to the region surrounding the cylinder. This connection can, for example, extend through an opening in a wall of the cylinder. This permits an advantageous inlet into the pressure-relief chamber, occurring independently of the fluid contained in the subspace.

In a preferred embodiment, the movement of the pressure-relief piston should occur along the cylinder axis. It is thus possible to take advantage of the given geometric circumstances in a particularly space-saving way.

A movement of the pressure-relief piston that reduces the volume of the pressure-relief chamber is advantageously oriented away from the second subchamber that does not contain this pressure-relief piston, i.e., also oriented away from the region in which the piston produces the pressure increase. In this way, it is possible to adapt a pressure-relief main direction of the pressure-relief device to a pressure shock direction of the pressure increase, thus counteracting the pressure increase in a particularly effective way. If so desired, this arrangement permits the stop element, in a double function, to also limit a movement of the piston toward the pressure-relief chamber. This is the case when no limitation is presented by the mechanics of the machine frame.

The pressure-relief device is suitably situated close to the corresponding longitudinal cylinder end. It is thus possible in a particularly simple fashion to prevent the subspace from having a bottleneck that would reduce the efficiency of the pressure-relief device. This also minimizes the stroke loss with an equivalent pressure-relief.

In a preferred embodiment, the wall of the cylinder itself constitutes at least part of the bearing surface. This allows the components of the piston-cylinder assembly to perform space-saving and cost-reducing double functions.

The pressure-relief chamber is also suitably embodied in the form of a cylinder. This allows it to advantageously adapt to the given geometric conditions of the piston-cylinder assembly and to make the most effective use of the existing space.

According to a particular embodiment, the pressure-relief chamber is embodied in the form of a torus-like cylinder. The expression "torus-like cylinder" is understood to mean a cylinder that contains another cylinder, which is smaller than it in the radial direction, but the same length as it in the axial direction. This is particularly advantageous if the pressure-relief device is situated in a subchamber that also accommodates a piston rod of the piston. Optimal use is made of the remaining space due to the fact that the piston rod is guided through the through-opening of the torus-like cylinder. In this case, on the one hand, the piston itself can comprise part of the bearing surface. The piston and pressure-relief piston thus serve as reciprocal bearing surfaces and permit a further savings of space, components, and building materials. On the other hand, a sleeve attached to the cylinder head and protruding into the interior of the cylinder advantageously constitutes the inner bearing surface, radially speaking, for the pressure-relief piston. The sleeve, therefore, is simultaneously also part of the partitioning arrangement and the piston rod is guided through an interior of the sleeve. In this case, a layer of the fluid contained in the subspace can still be present in the radial direction between the inner sleeve wall and the piston rod. Such an arrangement advantageously prevents the pressure-relief piston and the piston rod from rubbing against each other in their respective movements.

In relation to the cylinder axis, the cross-sectional area of the pressure-relief chamber can make up more than 20%, preferably more than 50%, and in particular more than 80% of the cross-sectional area of the cylinder interior. The area ratio of the piston can thus be correspondingly selected as a function of the demands on the piston and in particular the piston cross-section required for this, and as a function of the pressure increases to be expected.

On the other hand, it is also possible for the cross-sectional area of the pressure-relief chamber in relation to the cylinder axis to be from 1 to 20%, preferably 1 to 10%, and in particular 1 to 5% of the cross-sectional area of the cylinder interior. Such an embodiment of the piston-cylinder assembly advantageously makes it possible, reasoning conversely, for the cross-section of a piston rod of the piston, independent of the cross-sectional area of the cylinder interior, to occupy a correspondingly large region of up to 99% of the cross-sectional area of the cylinder interior. Thus, a high stability of the piston can be achieved despite the presence of the pressure-relief device. This also reduces the relative loss of stroke space.

The opening in the cylinder wall, which produces a connection from the region surrounding the cylinder to the pressure-relief chamber, can serve as a connection for a supply line and/or a valve and/or a pressure measuring device. Thus the pressure-relief device can be suitably connected to a hydropneumatic pressure circuit with which the pressure prevailing in the pressure-relief chamber can be controlled and measured. In this way, it is also possible to provide a control unit for the pressure-relief device and to affect the pressure-relief device. However, it is also possible to connect a supplementary volume to the opening. Through an appropriate selection of the volumetric capacity of this supplementary volume, it is likewise possible to influence the pressure in the pressure-relief chamber, thus permitting a pressure control to occur in a particularly simple fashion, namely a purely mechanical one.

In the above-mentioned instances of a connection of other components situated outside the cylinder, the pressure-relief device situated in the cylinder interior is automatically part of a larger pressure-relief apparatus situated both inside and outside the cylinder. A control unit for the pressure-relief device can also suitably be part of the pressure-relief apparatus.

The pressure-relief chamber can be filled with a pressure-relief fluid. Filling it with such a fluid makes it possible to advantageously achieve stable pressure conditions in the pressure-relief chamber. The pressure-relief fluid can be suitably acted on with a pressure or also with a primary pressure. In this way, it is possible in a particularly advantageous fashion to compensate for an inherent pressure that is present in the subspace independent of the fluid and acts on the pressure-relief chamber from the partition. In this case, the pressure prevailing in the pressure-relief fluid can be suitably adjusted by means of the opening. This makes it possible to control the pressure in the pressure-relief chamber. In addition, the counterpressure can be set to be at least as high as the pressure prevailing in the fluid contained in the subspace in an operating state that exists before the pressure increase is produced. It is thus advantageously possible to prevent a part of the action of the pressure-relief device from already being taken up by the fluid contained in the subspace, thus allowing the pressure-relief device to counteract the pressure increase to its fullest capacity.

In an advantageous embodiment of the piston-cylinder assembly, the counterpressure of the pressure-relief fluid is a predetermined value higher than the pressure prevailing in the fluid contained in the subspace in an operating state that exists before the pressure increase is produced. With such an adjustment, it is possible to move the piston toward the subchamber containing the pressure-relief device; the pressure-relief device counteracts a pressure increase caused by this movement only to an extremely small degree provided that quasi-static pressure conditions are present in the fluid contained in the subspace, i.e., provided that the piston movement occurs in an adiabatically slow fashion. This has the significant advantage that the piston can be positioned in relation to the cylinder, which is required in a positioning operation of the press, without the pressure-relief device interfering with the positioning movement (or with only a negligible degree of interference with the positioning operation by the pressure-relief device). In other words, the pressure-relief device and the pressure-relief chamber merely represent a dead zone in such a positioning movement.

The pressure-relief fluid suitably has a high compressibility. In particular, its compressibility can be higher than that of the fluid contained in the subspace. The action of the pressure-relief device also depends, among other things, on the absolute and relative compressibility of the pressure-relief fluid. This embodiment is consequently able to achieve a particularly effective pressure-relief device. The pressure-relief fluid is suitably a gas, in particular an inert gas. This represents a satisfactory and also reasonably priced provision of a pressure-relief fluid.

In lieu of and/or in addition to the pressure-relief fluid, in an embodiment that is particularly simple from a structural standpoint, a prestressing device is situated in the pressure-relief chamber. In this instance, the initial load of the prestressing device must be set high enough to generate a counterpressure with the properties that have already been explained above.

In a particularly simple embodiment, the prestressing device has a spring and in particular, is comprised of the spring. In particular, a boundary surface of the ventilation chamber can be fastened in detachable fashion so that the prestressing device or a part thereof can be replaced or can be exchanged, for example, for a different prestressing device with different prestressing characteristics. If it is a spring, for example, then a spring with a different force-path characteristic can be used as needed.

Also in the piston-cylinder assembly according to the invention, at least one pressure-relief device is situated in both subchambers, i.e., on each side of the piston. This has the particular advantage that even with an operation in which in both directions, the piston movement can cause a pressure increase to occur in the fluids contained in both of the subchambers, it is possible to counteract the respective pressure increase.

One or more of the subchambers, particularly in the region of the subspace that contains the fluid or also both subchambers, is/are suitably provided with a connection to the region surrounding the cylinder. This connection extends through a supply opening provided in the cylinder wall. In this way, the corresponding subchamber can be connected to a hydropneumatic system, permitting the press to be used for various potential applications. It is also possible to provide a position measuring system for the piston position. This advantageously facilitates the control of the piston-cylinder assembly, in particular during a positioning operation.

The piston-cylinder assembly can also be embodied in the form of a synchronizing cylinder. Then the piston has a piston rod on both ends in the direction of the cylinder axis and these rods pass through the corresponding longitudinal ends of the cylinder. Such a design allows the pressure increase produced by the piston movement to be caused by a mechanical load directly, i.e., without coupling via a hydropneumatic medium.

The scope of the invention also extends to hydraulic presses in which a piston-cylinder assembly according to the invention is used. The piston-cylinder assembly according to the invention can advantageously and successfully achieve its effect particularly in presses that use loose bulk material to manufacture stones suitable for use in the fireproofing industry.

The piston-cylinder assembly according to the invention can be used for a main working axis in a hydraulic press. Very powerful pressures and powerful pressure changes can be produced along these axes, making it particularly practical and advantageous to use the piston-cylinder assembly according to the invention.

On the other hand or in addition, the hydraulic press can use a piston-cylinder assembly according to the invention for an auxiliary working axis. This is particularly useful if there is the possibility of significant, abrupt pressure increases occurring in auxiliary cylinders. It is particularly advantageous to provide a hydraulic press with a piston-cylinder assembly according to the invention in an auxiliary working axis in which the auxiliary cylinder is used to move a mold that is used to shape a pressing material. As mentioned above, the advantageously relievable pressure increases occur here during the demolding of the finished pressed item when the mold is moved from a pressing position encompassing the finished pressed item into a release position that releases the pressed item.

Other details and advantages of the invention can be inferred from the following description of the exemplary embodiments shown in the figures.

BRIEF DESCRIPTION OF THE DRAWINGS

Embodiments of the invention are explained below with reference to the drawing, to which reference is made with respect to all details that are material to the embodiments.

FIG. 3 is a longitudinal sectional view of a piston-cylinder assembly according to the invention, which is intended for use in a press, e.g., can be used in one of the presses shown in FIGS. 1 and 2, FIG. 4 is a longitudinal sectional view another embodiment of a piston-cylinder assembly according to the invention.

DETAILED DESCRIPTION OF EMBODIMENTS OF THE INVENTION

Figure 1:
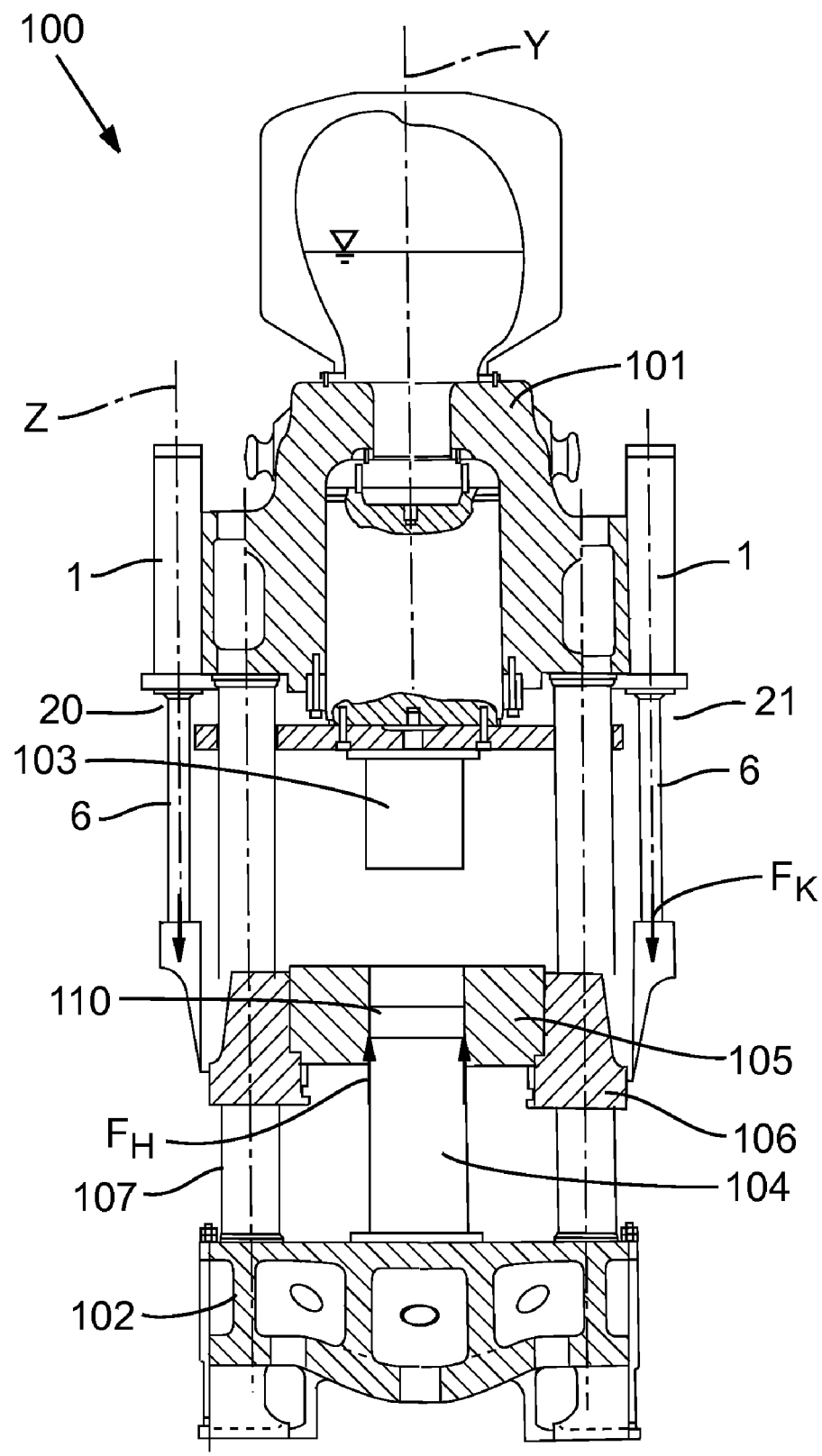
FIG. 1 is a longitudinal sectional view of a hydraulic press.

FIG. 1 is a schematic longitudinal section through a hydraulic press 100 in which several piston-cylinder assemblies 20, 21 according to the invention are used in auxiliary working axes Z. This hydraulic press 100 serves to produce pressed stones from a loose bulk material. The pressing of the bulk material occurs in that an upper die 103, moving along the main axis Y, compresses the bulk material piled loosely on the lower die 104. In this example, the lower die 104 is stationary and the upper die 103 moves in order to press against the lower die 104. It would also be conceivable to move both of the dies 103,104 or to move only the lower die 104. A mold 105 encompasses the loose bulk material and partially establishes the shape into which the bulk material is to be pressed. The mold 105 is thus a forming mold, which in accordance with its configuration, establishes the "lateral" form of the manufactured pressed stone 110. The mold 105 is mounted in stationary fashion in a mold wall 106, which can be moved along a plurality of movement columns 107 in the direction of the main working axis Y.

FIG. 1 is a schematic longitudinal section through a hydraulic press 100 in which several piston-cylinder assemblies 20, 21 according to the invention are used in auxiliary working axes Z. This hydraulic press 100 serves to produce pressed stones from a loose bulk material. The pressing of the bulk material occurs in that an upper die 103, moving along the main axis Y, compresses the bulk material piled loosely on the lower die 104. In this example, the lower die 104 is stationary and the upper die 103 moves in order to press against the lower die 104. It would also be conceivable to move both of the dies 103,104 or to move only the lower die 104. A mold 105 encompasses the loose bulk material and partially establishes the shape into which the bulk material is to be pressed. The mold 105 is thus a forming mold, which in accordance with its configuration, establishes the "lateral" form of the manufactured pressed stone 110. The mold 105 is mounted in stationary fashion in a mold wall 106, which can be moved along a plurality of movement columns 107 in the direction of the main working axis Y.

The working point depicted in FIG. 1 shows a situation in which the pressing procedure has already been executed and the upper die 103 has already been retracted upward from the pressed stone 110 resting in the mold 105. The press 100 is now ready for the next work step, the demolding of the pressed stone 110 from the mold 105. To that end, the mold 105 should travel in relation to the pressed stone 110 through a movement in the direction of the working axis Y, Z. The static friction force $F_H$ between the stone 110 and mold 105 resists such a traveling movement. The static friction force $F_H$ must be overcome in order for the traveling movement to begin and consequently, only the sliding friction between the stone 110 and mold 105 resists the movement.

The magnitude of the static friction force $F_H$ can be considerable. Thus, in the domain of the fireproofing industry, presses 100 like the hydraulic press shown in FIG. 1 work with forces in the forming sector that are on the order of 4,000 kN to 36,000kN. During the pressing procedure, powerful forces are also correspondingly generated, which act on the lateral boundary surfaces of the mold 105 transversely in relation to the direction of the main working axis Y, i.e., the loose bulk material is pressed against the mold walls by very powerful forces.

In the exemplary embodiment shown in FIG. 1, the mold wall 106 and the mold 105 are moved by piston-cylinder assemblies 20, 21 whose cylinders 1 are attached to the upper arbor 101 of the hydraulic press 100. Pressure on the pistons 5 of the piston-cylinder assemblies 20, 21 exerts a force $F_K$ along the auxiliary working axis Z in the piston extending direction (direction of the extending piston rod 6), i.e., the force direction $F_K$, on the mold wall 106. This force $F_K$ for moving the mold wall 106 and mold 105 downward is counteracted by the static friction force $F_H$ in its direction $F_H$ since the pressed stone 110 rests on the lower die 104 of the hydraulic press 100, i.e., cannot move along with the mold 105.

In this work step, the advantages of the piston-cylinder assembly 20, 21 according to the invention come into play. To be precise, the traveling motion of the mold wall 106 does not begin the moment the piston-cylinder assemblies 20, 21 begin exert a force $F_K$ on it. Only after the force $F_K$ is powerful enough to overcome the static friction force $F_H$ does the sudden transition from static friction to sliding friction occur in a breakaway moment, whereupon the movement begins.

The piston-cylinder assemblies 20, 21 now have pressure-relief devices inside the cylinder 1, which counteract a pressure increase inside the cylinder that occurs at this breakaway moment, as will be described more precisely below in conjunction with FIG. 3. This makes it possible to prevent or at least attenuate undesirable vibrations that would otherwise occur with the sudden breakaway moment.

In the example shown in FIG. 1, the increases in pressure in the piston-cylinder assemblies 20, 21 particularly occur in the annular surface chambers (10.1 in FIG. 3). It is also possible, however, when the mold 105 is kept stationary, for the lower die 104 to be moved upward through relative movement in relation to the lower arbor 102 of the hydraulic press 100. In this case, the lower die 104 would be embodied, for example, as a piston of a piston-cylinder assembly according to the invention.

Figure 2:
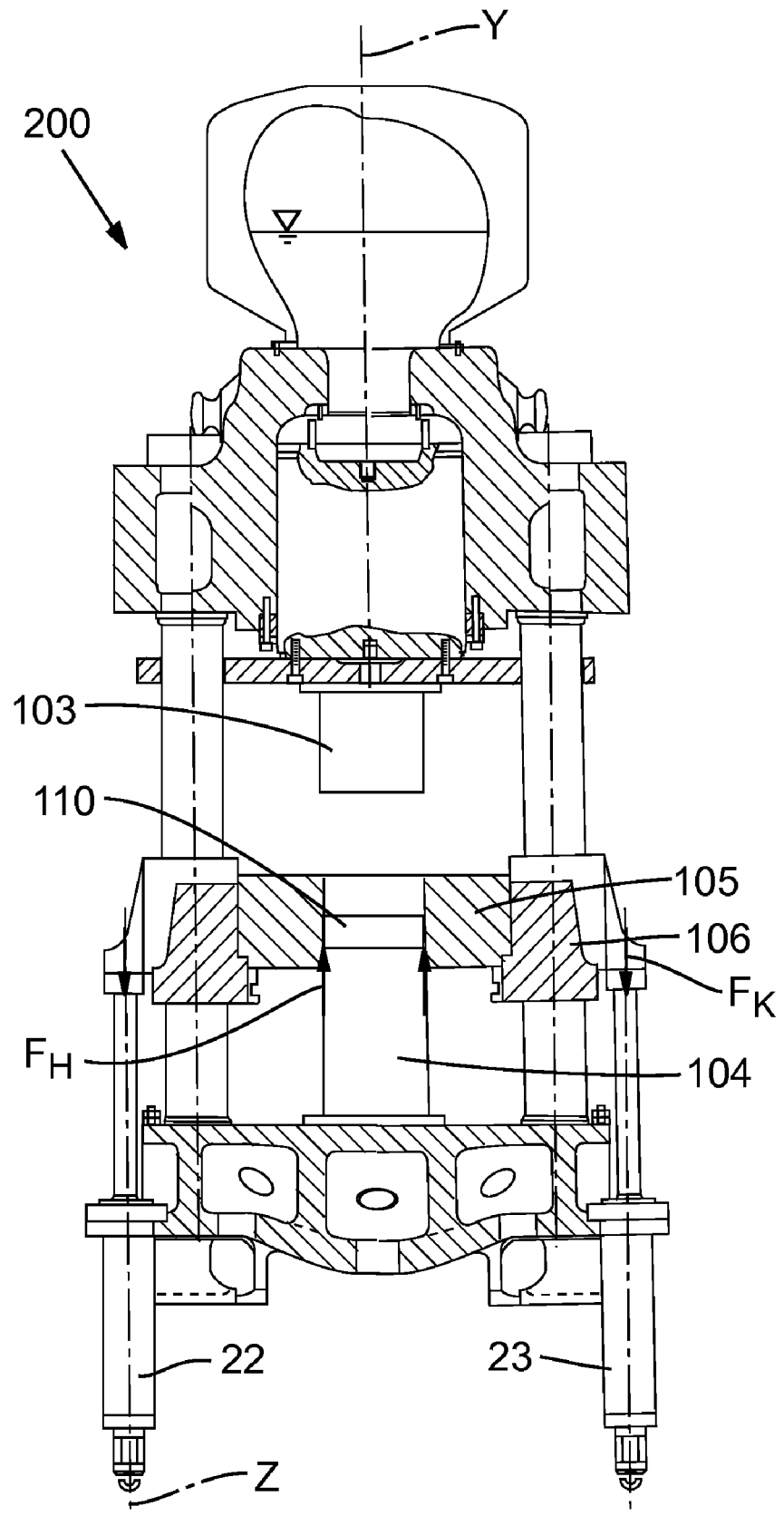
FIG. 2 is a longitudinal sectional view of another embodiment of a hydraulic press.

FIG. 2 schematically depicts another embodiment of a hydraulic press 200. The design of this hydraulic press 200 is similar to the design of the hydraulic press 100 from FIG. 1; components that remain the same have been provided with the same reference numerals. The working point recorded is also the same: the stone 110 has already been pressed, the upper die 103 retracted, and the mold in turn will be subsequently moved downward as a work step.

However, the cylinder ends of the piston-cylinder assemblies 22, 23 in this embodiment are attached to the lower arbor 102 of the hydraulic press 200 and the mold wall 106 is attached to the piston rods 6 of the assemblies. The downward movement of the mold 105 therefore occurs through a retracting motion of the piston rods 6 into the cylinders 1 of the piston-cylinder assemblies 22, 23. In such an embodiment, the pressure increase at the breakaway moment is now no longer generated in the fluid contained in the annular surface chamber (10.1 in FIG. 4) of the piston-cylinder assemblies 22, 23, but rather in the fluid contained in the piston surface chamber (10.2 in FIG. 4). Correspondingly, pressure-relief devices are also provided at least on the piston surface side of these piston-cylinder assemblies 22, 23; a more precise description of the corresponding device can be found below in the description of FIG. 4.

Furthermore, in this embodiment of the hydraulic press 200 shown in FIG. 2, the piston-cylinder assemblies 22, 23 can also be used in a double function as legs for the hydraulic press 200. Moreover, the embodiments of the hydraulic presses shown in FIGS. 1 and 2 can also conceivably be combined so that the mold wall 106 can be pulled downward by the piston-cylinder assemblies 22, 23 and can also be pushed upward by the piston-cylinder assemblies 20, 21. It is also conceivable to have the demolding procedure occur through a mold movement in the upward direction. This would then result in an extension of the piston-cylinder assemblies 22, 23 attached to the lower arbor of the press and/or a retraction of the piston rods 6 by the piston-cylinder assemblies 20, 21 attached to the upper arbor 101. Naturally, in a case in which the mold 105 is moved upward in relation to the pressed stone 110 during the demolding procedure, it is also possible for the upper die 103 to be moved downward while the mold is immobilized 105. Then the upper die 103 would be used, for example, as a piston of a piston-cylinder assembly according to the invention used in the main working direction Y. It is also possible for the connecting points of the piston-cylinder assembly to be rotated, i.e., the above-mentioned procedures are likewise possible not only when the cylinder tube is affixed to the upper arbor 101 and the piston moves together with the piston rod 6, but also when the piston rod 6 and the piston are attached to the upper arbor 101 and the cylinder tube moves.

In conjunction with FIG. 3, a description will now be given of a preferred embodiment of a piston-cylinder assembly according to the invention of the kind that are used, for example, as auxiliary cylinder 20,21 for the auxiliary working axis Z of a hydraulic press described in FIG. 1. FIG. 3 is a longitudinal section along the cylinder axis X of the cylinder 1 of the piston-cylinder assembly. The cylinder 1 is encompassed by cylinder walls, which are composed of the cylinder tube 2, the cylinder head 3, and the cylinder base 4. Entirely inside the interior of the cylinder 1, there is the cylinder head 5.1 of a piston 5 whose piston rod 6 extends along the cylinder axis X and extends through the cylinder head 3. At the end of the piston rod oriented away from the piston head 5.1, a fastening device is attached in flange-like fashion, by means of which the piston rod 6 is attached to another press part through the use of suitable fastening means, e.g., threaded bolts of the kind shown in FIG. 3. This press part could, for example, be the mold or mold wall or a part of a press that is connected to these parts and is for shaping loose bulk material.

The head of the piston 5.1 divides the cylinder interior 10 into two subchambers 10.1 and 10.2. In FIG. 3, the subchamber 10.1 is a cylinder annular surface chamber and the corresponding effective area of this subchamber 10.1 is the annular surface that is constituted by the difference between the piston interior cross-sectional area and the piston rod cross-sectional area. In this connection, the cross-sectional area of the piston rod 6 is naturally smaller than that of the cylinder interior 10, but can otherwise be embodied independently of it. The second subchamber 10.2 or cylinder piston surface chamber has the full cross-sectional area of the cylinder inner chamber 10 as an effective area.

Both the cylinder annular surface chamber 10.1 and the cylinder piston surface chamber 10.2 are provided with cylinder connections 13 (annular surface) and 16 (piston surface). These openings in the cylinder wall permit fluids to travel into the subchambers 10.1 and 10.2 and their pressures can be adjusted independently of each other by means of systems connected to the cylinder connections. The cylinder surface cylinder connection 16 is situated directly at the base end of the cylinder; the annular surface cylinder connection 13, however, is offset by a certain distance toward the middle of the cylinder from the head end of the cylinder. When the piston 5 is situated the maximum distance from the cylinder base 4, the annular surface cylinder connection 13 is nevertheless situated close to the head end of the piston head 5.1 of the piston 5. This is due to the presence of a pressure-relief device in the subchamber 10.1 provided at the head end of the cylinder. This pressure-relief device occupies a region of the cylinder interior 10, correspondingly shifting the annular surface cylinder connection 13 toward the middle of the cylinder.

A position measuring unit 14 for measuring the piston position is provided outside the cylinder at the cylinder base 4 and is suitably coupled to the piston 5. The position measuring unit 14 serves to detect the position of the piston 5 at all times and to supply it to a control unit (not shown). In this case, the cylinder base 4 can have a suitable recess that serves to accommodate an element, which is attached to the base end of the piston and is part of the position detection system to which the position measuring unit 14 is coupled.

Naturally, the piston-cylinder assembly is equipped with the necessary ring seals depicted as black squares in FIG. 3; otherwise, the piston-cylinder assembly described up to this point corresponds to a conventional piston-cylinder assembly equipped with position measurement of the piston position, with the exception of the annular surface cylinder connection 13, which is offset toward the cylinder middle.

According to the invention, a pressure-relief device is provided on the interior 10 of the cylinder—in the cylinder annular surface chamber 10.1 in the exemplary embodiment shown in FIG. 3. To that end, the cylinder annular surface chamber 10.1 is further subdivided into a subspace 9, which contains a fluid and corresponds to the entire cylinder annular surface chamber 10.1 of a conventional piston-cylinder assembly, and a pressure-relief chamber 8 of the pressure-relief device. The pressure-relief chamber 8 here occupies a short region of the cylinder annular surface chamber 10.1 in the direction of the cylinder axis X, but constitutes a large portion of the remaining annular surface in the cross-sectional direction. The pressure-relief chamber 8 is sealed off from the subspace 9 by a movably supported pressure-relief piston 7 and a sleeve 11.1 composed of a suitable material. The pressure-relief piston 7 and sleeve 11.1 thus constitute a partitioning arrangement for the pressure-relief chamber 8 in relation to the subspace 9. The pressure-relief chamber 8 is thus situated between the cylinder tube wall 2 and the sleeve; toward the top, i.e., toward the cylinder base 4, the pressure-relief chamber 8 is delimited by the pressure-relief piston 7, which in this embodiment is provided with an annular surface-like cross-section, and is delimited at its lower end in FIG. 3 toward the cylinder head (3) by the cylinder head 3 itself. The cylinder tube 2 delimits the pressure-relief chamber 8 in the direction extending radially outward from the cylinder axis X.

Basically as a result of its arrangement inside the cylinder interior 10, the pressure-relief chamber 8 shortens the stroke of the piston-cylinder assembly by precisely the length that it extends from a cylinder end toward the cylinder middle. In the embodiment shown in FIG. 3, the pressure-relief chamber 8 therefore extends to the cylinder head 3. The sleeve 11.1 of the pressure-relief chamber 8, however, extends further toward the cylinder tube 2 due to the fact that it bends sharply outward radially at the level of the cylinder head end of the pressure-relief chamber 8. A corresponding double-L-shaped longitudinal section profile makes the sleeve 11.1 of the pressure-relief chamber 8 particularly strong and rigid. The pressure-relief chamber 8 thus represents an additional torus-like cylinder that is separate from the interior 10 of the cylinder 1 and is integrated into the cylinder.

The pressure-relief piston 7, which represents the part of the partitioning arrangement of the pressure-relief chamber 8 oriented toward the piston head 5.1, is movably supported. It can be moved along a bearing surface 11 of the pressure-relief device in the direction of the cylinder axis X. In the embodiment of the piston-cylinder assembly shown in FIG. 3, the bearing surface 11 is composed of the outer bearing surface 11.3 embodied on the inside of the cylinder tube 2 and of the inner bearing surface 11.2, i.e., the sleeve 11.1. The pressure-relief piston 7 thus extends along two concentric cylinder tube walls that also delimit the pressure-relief chamber 8 in the direction transverse to the cylinder axis X. The subspace 9 and the pressure-relief chamber 8 are volumetrically coupled to each other by the movable pressure-relief piston 7. A movement of the pressure-relief piston 7 from the cylinder base 4 toward the cylinder head 3 increases the volume of the subspace 9 and decreases the volume of the pressure-relief chamber 8. By contrast, a movement of the pressure-relief piston 7 from the cylinder head 3 toward the cylinder base 4 produces an expansion of the pressure-relief chamber 8 and a corresponding contraction of the subspace 9. In both cases, however, the subspace 9 and pressure-relief chamber 8 remain separated from each other.

A stop ring 12 is fastened to the end surface of the sleeve 11.1 oriented toward the cylinder base 4. With regard to the cross-sectional area, this stop ring 4 is just large enough to reliably limit a movement of the pressure-relief piston 7 toward the cylinder base 4, namely as soon as the end of the pressure-relief piston 7 oriented toward the cylinder base 4 strikes against the stop ring 12. However, at most, the cross-sectional area of the stop ring is permitted to be of such a size that as large as possible an area portion of the end of the pressure-relief piston 7 oriented toward the cylinder base 4—and therefore oriented toward the fluid contained in the subspace 9—remains uncovered in the stop position, i.e., this end of the pressure-relief piston 7 must have the largest possible area of contact with the fluid contained in the subspace 9. In addition, the stop ring 12 can also delimit the movement of the piston 5 in the direction of the cylinder head 3.

Finally, a connection 15 for the pressure-relief chamber 8 is also provided, which is implemented in the form of an opening in the cylinder tube 2. This connection 15 makes it possible to exert pressure on a fluid contained in the pressure-relief chamber 8. The opening can be closed; it can have a valve connected to it or also other parts that then constitute a pressure-relief apparatus in concert with the pressure-relief device situated in the interior 10 of the cylinder 1.

The following section will describe the function of the pressure-relief device with a corresponding pressure increase in the fluid contained in the subchamber 10.1 or subspace 9 due to a movement of the piston 5 toward the subchamber 10.1, i.e., the annular surface chamber. Such a pressure increase can occur, for example, when the piston-cylinder assembly occurs as an auxiliary cylinder 20, 21 in the auxiliary working axis Z of the hydraulic press shown in FIG. 1. An extending movement of the piston 5 and the piston rod 6 out from the cylinder tube 2 will be prevented by a holding force $F_H$, which holds the end of the piston rod 6 protruding from the cylinder tube 2. Overcoming this holding force $F_H$ requires a piston-side critical force $F_c$. Once this critical force $F_c$ is exceeded, an extending movement of the piston is no longer resisted by the holding force $F_H$, but by a significantly smaller force $F_R$. Achieving the critical force $F_c$ requires a corresponding critical pressure $p_c$ in the subchamber 10.2, i.e., the cylinder piston surface chamber and in the fluid contained therein. When the pressure p in the subchamber 10.2 increases, this yields a definite compression volume in the subchamber 10.2. This compression volume is determined by the volume by which the fluid contained in the subchamber 10.2 would increase the volume of the subchamber 10.2 through an extending movement of the piston 5 if the holding force $F_H$ were to present no resistance to this movement.

Shortly before or at the moment in which the critical pressure $p_c$ is reached in the subchamber 10.2 due to a pressure increase produced by means of the connecting opening 16, this compression volume is at its maximum. At the breakaway moment, i.e., the instant in which the holding force $F_H$ is overcome, the pressure in this compression volume is suddenly relieved. The piston 5 extends with an accelerated movement and the fluid contained in the subchamber 10.1 or subspace 9 experiences a pressure increase due to the movement of the piston 5. Due to such a sudden unleashing of the pressure stored in the subchamber 10.2, the pressure changes that occur in the subchamber 10.1 or subspace 9 due to the accelerated movement of the piston 5 represent a nonequilibrium process. A time interval τ in which the sudden breakaway occurs represents a characteristic value of this highly dynamic event. In the above-described presses used for shaping bulk material in the domain of the fireproofing industry, these characteristic time intervals τ can be 20 ms or less. Without the pressure-relief device according to the invention, the sequences explained above would then occur accompanied by vibration-induced strain and damage to the press.

These sequences, however, can be prevented with the pressure-relief device according to the invention. This occurs as follows. The pressure increase due to the movement of the piston 5 occurs in the fluid contained in the subspace 9 of the subchamber 10.1. But this fluid rests against the pressure-relief piston 7 of the pressure-relief device and can transmit the pressure increase directly to the pressure-relief piston 7. Naturally, via the annular surface cylinder connection 13, the pressure increase also spreads into the pressure system connected to the annular surface cylinder connection 13. The pressure relief in this regard, however, occurs over longer time frames and will not be taken into account in the considerations below. By contrast, the pressure action of the fluid contained in the subspace 9 acts on the pressure-relief piston 7 of the pressure-relief device integrated into the piston interior 10 over short time frames on the order of $\tau$.

In this embodiment, the pressure-relief chamber 8 of the pressure-relief device is filled with a gas, e.g., nitrogen. Thus in this embodiment, the gas functions as a pressure-relief fluid. In this case, the gas in the pressure-relief chamber 8 is at a pressure that corresponds at least to the pressure of the fluid contained in the subspace 9 before the pressure increase caused by the piston 5; the pressure-relief piston 7 is thus resting against the stop ring 12 and the volume of the pressure-relief chamber 8 is at its maximum before the breakaway.

The sudden exertion of pressure by the fluid contained in the subspace 9 on the pressure-relief piston 7 forces the pressure-relief piston 7 to execute a movement that increases the volume of the subspace 9 and reduces the volume of the pressure-relief chamber 8. The enlargement of the subspace 9, however, is accompanied by a pressure relief of the fluid contained in the subspace 9. This pressure relief thus reduces the elevated pressure that has been produced by the movement of the piston 5 in the fluid contained in the subspace 9 and thus counteracts the pressure increase.

The dynamically detailed sequence of this pressure relief naturally depends on a number of factors such as the volumetric size ratios, the various subchambers, the time interval $\tau$, the structurally dictated reaction time of the pressure-relief device, the pressures and pressure differences in the pressure-relief chamber 8 and in the subspace 9, etc. However, the principle of pressure relief by counteracting the pressure increase still occurring in the cylinder interior 10 is independent of the above-mentioned factors. The fluid contained in the subspace 9 that experiences the pressure increase likewise permits an enlargement of the subspace 9 for pressure relief in a sudden fashion, with correspondingly short reaction times. On the one hand, the pressure-relief device integrated into the cylinder interior 10 reduces a pressure surge travel distance, yielding relatively short reaction times; on the other hand, a pressure relief succeeds without line resistance dictated by the conduit routing.

The size, number, and placement of such pressure-relief devices according to the invention can be structurally varied. Thus the pressure-relief chamber does not have to extend along the entire annular surface. It is also possible to provide one or more pressure-relief chambers whose cross-sections are the shape of circular segments. The sleeve 11.1 that delimits the pressure-relief chamber 8 radially in the direction toward the cylinder axis X can also be replaced by the piston rod 6. In this instance, the piston rod 6 and pressure-relief piston 7 serve as reciprocal bearing surfaces. The stop element 12 would then be fastened to the cylinder tube 2. On the whole, the stop element could be embodied in a variety of forms and could, for example, be fastened to the cylinder tube instead of the partition surface. It also does not have to be a full ring, but can instead, for example, be embodied in the form of multiple stop elements that protrude inward in flange-like fashion from the cylinder tube, extending into the subchamber 10.1, naturally while retaining the above-explained functionality.

In the exemplary embodiment shown in FIG. 3, a gas valve is connected to the connection 15 of the pressure-relief chamber 8 and the pressure-relief chamber 8 is filled with gas. In this exemplary embodiment, the gas pressure in the pressure-relief chamber 8 can be controlled from the outside, but this feature is not an absolute necessity. This control can be provided by means of a control system that is connected to the connection of the pressure-relief chamber 8, but can also be provided by means of supplementary volumes (not shown) that are connected to the connection. An increase in the total volume of the pressure-relief chamber 8 to the sum of the pressure-relief chamber 8 plus the supplementary volumes makes it possible to reduce the gas pressure in the pressure-relief chamber 8. It is correspondingly possible, through selection of supplementary volumes of different sizes, to vary the pressure in the pressure-relief chamber.

FIG. 4 shows a longitudinal section through another embodiment of a piston-cylinder assembly according to the invention. This embodiment differs from the one shown in FIG. 3 in that a pressure-relief device is also situated in the subchamber 10.2, i.e., the cylinder piston surface chamber. Since this end of the cylinder interior 10 does not contain a piston rod 6, the pressure-relief chamber 8' can extend over the entire cross-section of the cylinder interior. As a result, a maximum pressure-relief volume 8' is achieved with only a slightly reduced stroke of the piston-cylinder assembly. In this case, the piston surface-side pressure-relief piston 7' has the same cross-section as the head 5.1 of the piston 5, namely the entire cross-section of the cylinder interior 10. The stop ring 12' on the piston surface side in this case is fastened directly to the cylinder tube 2.

As in the embodiment shown in FIG. 1, the stop ring 12' serves to limit the movement of the pressure-relief piston 7' oriented toward the head of the piston 5 and also serves to limit the piston 5 with regard to a movement toward the cylinder base 4. The cylinder surface cylinder connection 16 is shifted toward the middle of the cylinder by the distance by which the pressure-relief chamber 8' extends into the cylinder interior 10 or subchamber 10.2. In this embodiment, the connection 15' to the pressure-relief chamber 8' is routed through the cylinder base 4; it could, however, just as easily be routed laterally through the cylinder tube 2 like the connection 15 of the pressure-relief chamber 8. However, the arrangement of the connection 15' along the cylinder axis 6 is useful since this reduces the line resistance of any line system connected to the connection 15' in comparison to a connection oriented transversely in relation to the cylinder axis X.

The piston-cylinder assembly shown in FIG. 4, which is equipped with a pressure-relief device on both the piston surface side and on the annular surface side, ensures that a pressure-relief can occur in the event of pressure changes in the corresponding fluids in the corresponding subchambers or subspaces caused either by a piston extension or a piston retraction. Such a piston-cylinder assembly is thus sensitive to pressure increases in both of the acting directions that correspond to a piston extension or piston retraction and can, for example, be used as an auxiliary cylinder 22, 23 of the hydraulic press depicted in FIG. 2.

Figure 5:
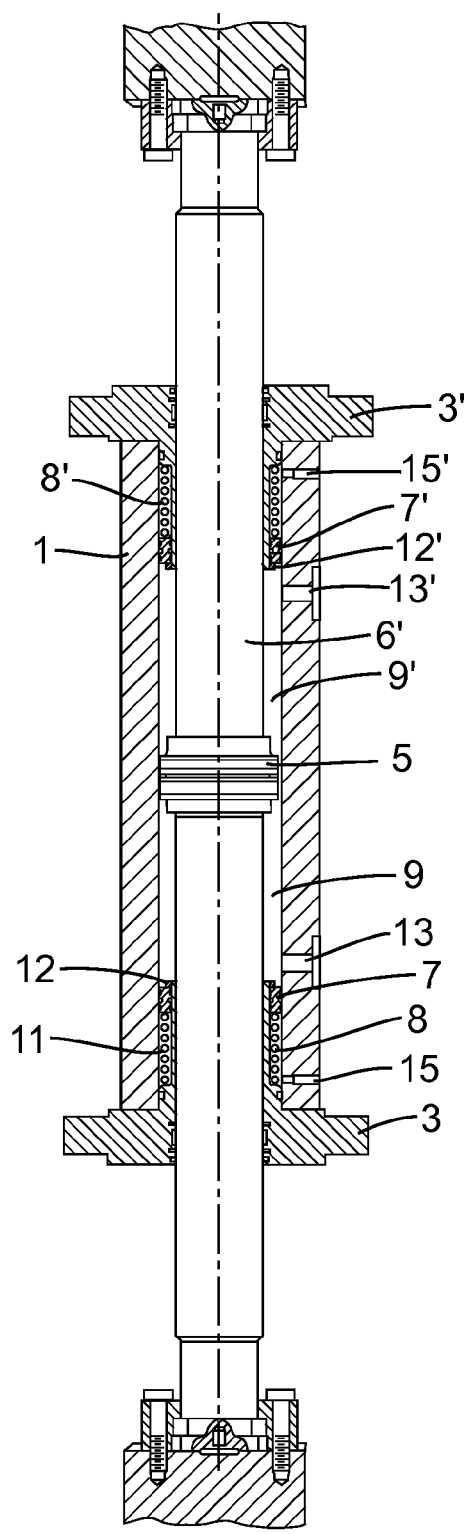
FIG. 5 is a longitudinal sectional view of another embodiment of a piston-cylinder assembly according to the invention.

A pressure-relief device according to the present invention for a piston-cylinder assembly can also be built into one or both sides of a synchronizing cylinder. Thus, for example, FIG. 5 shows such a two-sided arrangement. In this embodiment, the piston 5 has two piston rods 6, 6' and at the end of the cylinder 1 oriented away from the cylinder head 3, an additional cylinder head 3' is provided, through which the cylinder rod 6' extends. The subchamber 10.2 is thus embodied in the form of an annular surface chamber and has a subspace 9' that contains a fluid. The subspace 9' is provided with an annular surface cylinder connection 13' in the same way as the devices situated on the other side of the piston head 5.1. In this embodiment, the pressure-relief device in the additional cylinder annular surface chamber 10.2 is equipped in a way that is completely analogous to the first pressure-relief device in the subchamber 10.1 and is therefore embodied in the same way as has been explained in detail in the description of FIG. 3. There is thus a pressure-relief chamber 8' that is analogous to the pressure-relief chamber 8 and is delimited at a bearing surface 11' along the cylinder axis X and closed in the direction toward the cylinder axis X by a movably supported pressure-relief piston 7'. A stop ring 12' and a connection 15' for the pressure-relief chamber 8' are also provided.

Figure 6:
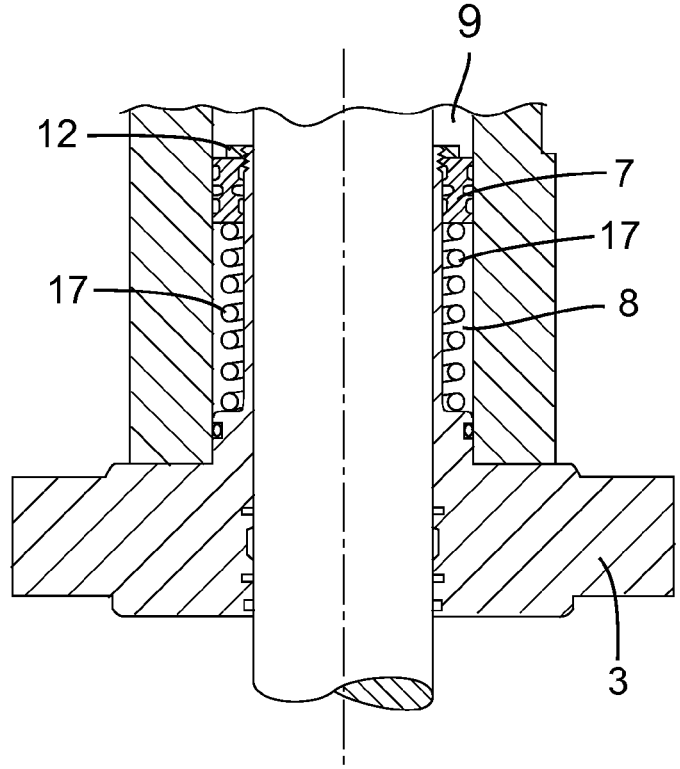
FIG. 6 illustrates a part of a longitudinal sectional view of yet another embodiment of a piston-cylinder assembly according to the invention, in which a spring is part of the pressure-relief device according to the invention.

Finally, FIG. 6 shows another part of a longitudinal section through another embodiment of a piston-cylinder assembly according to the invention, in which an annular spring 17 is situated in the pressure-relief chamber 8. It is clear that in the event of a pressure peak in the subspace 9, a pressure relief occurs through a compression of the annular spring 17. This embodiment shown in FIG. 6 is particularly easy to achieve from a structural standpoint. Depending on the required use, annular springs with different force-path characteristics can be used.

The invention is not limited to the exemplary embodiments explained in conjunction with the drawings. Instead, the intent is to implement the illustrated examples of the invention individually and in potential combinations thereof. In addition, hydraulic presses in which piston-cylinder assemblies according to the invention are used also expressly constitute components of this invention.

The invention claimed is:

1. A piston-cylinder assembly comprising:
   a piston at least partially disposed in a cylinder, the piston dividing an interior of the cylinder into two subchambers along a longitudinal axis defined by the cylinder; and
   a pressure-relief device disposed in at least a first subchamber and configured to counteract a pressure increase of a first fluid contained in the first subchamber resulting from a movement of the piston along the longitudinal axis in a direction toward the first subchamber, the pressure-relief device including:
   a pressure-relief chamber; and
   a partitioning arrangement dividing the pressure-relief chamber from a subspace of the first subchamber, the subspace being configured to accommodate the first fluid, wherein the partitioning arrangement is configured such that the subspace increases in volume in response to the pressure increase of the first fluid and the pressure-relief chamber decreases in volume in response to the pressure increase of the first fluid;
   wherein the partitioning arrangement includes a pressure-relief piston configured to move in relation to the cylinder and to decrease the volume of the pressure-relief chamber by moving away from a second subchamber of the cylinder; and
   wherein the pressure-relief piston is configured to counteract the pressure increase when the movement of the piston results from a relief of a pressure increase of a second fluid contained in a compression volume formed in a second subchamber prior to overcoming a holding resistance.

2. The piston-cylinder assembly of claim 1, wherein the pressure-relief device includes a bearing surface, and wherein the pressure-relief piston is configured to move along the bearing surface.

3. The piston-cylinder assembly of claim 2, wherein at least a part of the bearing surface is formed by a wall of the cylinder.

4. The piston-cylinder assembly of claim 2, further comprising a piston rod passing through the first subchamber and the pressure-relief device, the piston rod forming at least part of the bearing surface.

5. The piston-cylinder assembly of claim 1, wherein the pressure-relief device includes a stop element configured to limit movement of the pressure-relief piston.

6. The piston-cylinder assembly of claim 1, further comprising an opening in a wall of the cylinder to connect the pressure-relief chamber to a region surrounding the cylinder.

7. The piston-cylinder assembly of claim 1, wherein the pressure-relief chamber is filled with a pressure-relief fluid having an adjustable counterpressure, and wherein the opening is configured to permit adjusting of the counterpressure.

8. The piston-cylinder assembly of claim 7, wherein the counterpressure is at least as high as a pressure of the first fluid in the subspace when the piston-cylinder assembly is in an operating state prior to the pressure increase.

9. The piston-cylinder assembly of claim 7, wherein the pressure-relief fluid has a compressibility greater than a compressibility of the first fluid in the first subchamber.

10. The piston-cylinder assembly of claim 7, wherein the pressure-relief fluid is a gas.

11. The piston-cylinder assembly of claim 1, further comprising a supply opening in a wall of the cylinder to connect at least one of the subchambers with a region surrounding the cylinder.

12. The piston-cylinder assembly of claim 1, further comprising a position measuring system configured to detect a position of the piston.

13. The piston-cylinder assembly of claim 1, wherein a cross-sectional area of the pressure-relief chamber along the longitudinal axis of the cylinder is at least 20% of a cross-sectional area of the interior of the cylinder.

14. The piston-cylinder assembly of claim 13, wherein the cross-sectional area of the pressure-relief chamber is at least 80% of the cross-sectional area of the interior of the cylinder.

15. The piston-cylinder assembly of claim 1, wherein a cross-sectional area of the pressure-relief chamber along the longitudinal axis of the cylinder is in a range of 1% to 20% of a cross-sectional area of the interior of the cylinder.

16. The piston-cylinder assembly of claim 15, wherein the cross-sectional area of the pressure-relief chamber is in a range of 1% to 5% of the cross-sectional area of the interior of the cylinder.

17. The piston-cylinder assembly of claim 1, further comprising a prestressing device disposed in the pressure-relief chamber, the prestressing device having an initial load adapted to generate a counterpressure at least as high as a pressure of the first fluid in the subspace when the piston-cylinder assembly is in an operating state prior to the pressure increase.

18. The piston-cylinder assembly of claim 17, wherein the counterpressure of the prestressing device is higher than the pressure of the first fluid in the subspace when the piston-cylinder assembly is in an operating state prior to the pressure increase.

19. The piston-cylinder assembly of claim 17, wherein the prestressing device is a spring.

20. The piston-cylinder assembly of claim 17, wherein the pressure-relief chamber includes a partitioning surface detachably fastened such that a detachment of the partitioning surface permits an access to the prestressing device.

21. The piston-cylinder assembly of claim 1, wherein the pressure-relief device has a reaction time of less than 100 milliseconds (ms).

22. The piston-cylinder assembly of claim 21, wherein the reaction time is less than a period of time in which the pressure increase is produced.

23. A hydraulic press comprising:
  at least one piston-cylinder assembly including a piston at least partially disposed in a cylinder, the piston dividing an interior of the cylinder into two subchambers along a longitudinal axis defined by the cylinder; and
  a pressure-relief device disposed in at least a first subchamber and configured to counteract a pressure increase of a first fluid contained in the first subchamber resulting from a movement of the piston along the longitudinal axis in a direction toward the first subchamber, the pressure-relief device including:
    a pressure-relief chamber; and
    a partitioning arrangement dividing the pressure-relief chamber from a subspace of the first subchamber, the subspace being configured to accommodate the first fluid, wherein the partitioning arrangement is configured such that the subspace increases in volume in response to the pressure increase of the first fluid and the pressure-relief chamber decreases in volume in response to the pressure increase of the first fluid;
  wherein the partitioning arrangement includes a pressure-relief piston configured to move in relation to the cylinder and to decrease the volume of the pressure-relief chamber by moving away from a second subchamber of the cylinder; and
  wherein the pressure-relief piston is configured to counteract the pressure increase when the movement of the piston results from a relief of a pressure increase of a second fluid contained in a compression volume formed in a second subchamber prior to overcoming a holding resistance.

24. The press of claim 23, wherein the at least one piston-cylinder assembly is disposed along a main working axis of the press.

25. The press of claim 23, wherein the at least one piston-cylinder assembly is disposed along an auxiliary working axis for moving a press mold out of a press position into a release position.

* * * * *